Patented Mar. 8, 1949

2,464,094

UNITED STATES PATENT OFFICE 2,464,094

PROCESS FOR THE AMIDATION OF ESTERS

Edwin Marshall Meade, Manchester, England, assignor to Lankro Chemicals Limited, Manchester, England, a British company No Drawing. Application August 10, 1944, Serial No. 548,936. In Great Britain September 13, 1943

2 Claims. (Cl. 260—404)

This invention relates to the amidation of esters.

It is known as a classical preparative method that acid amides may be formed by the interaction between esters and ammonia or amines. This reaction may be carried out with the aid of a solvent such as methanol, which is a particularly powerful solvent for ammonia and the lower alkylamines, or without a solvent, under pressure if necessary, usually with an excess of the amine, and the reaction may also be expedited by the aid of a catalyst (cf. J. A. C. S., (1942), 64, 2498), known catalysts being salts, the most powerful apparently being the hydrochloride of the amine used.

I have found a considerably more powerful catalyst, namely, an alkali metal, its alcoholoxide, amide or other alkali metal compound which will generate an alkali metal alcoholoxide on contact with an alcohol.

Accordingly the present invention provides a process for the manufacture of amides which comprises reacting an ester with ammonia or an amine which has a replaceable hydrogen attached to a nitrogen atom, in the presence of a catalyst consisting of an alkali metal alcoholoxide which is added as such or formed in situ from added alcohol or from the alcohol displaced by the amidation reaction reacting with an alkali metal or a highly reactive strongly alkaline source such as an amide or organometallic compound of an alkali metal.

The use of my particular catalyst in the amidation reaction is general and is applicable to esters and amines both of which may be either mono- or polyvalent, or substituted with substituents which do not destroy the catalyst, suitable substituents being therefore hydroxy, alkoxy, hydrocarbon, non-labile halogen such as in p-chlorbenzoic esters, and unsuitable substituents being labile halogen, unneutralized acidic groups and the like. Water is, in general, unfavorable, since it allows the catalyst to be destroyed by saponification of the ester, but the presence of small amounts of water may usually be overcome by the use of more catalyst. When polyamines such as ethylenediamine are used, a further source of inactivation of the catalyst may arise from water produced chemically by cyclization of the initial aminoethylamide to an iminazoline, but again the addition of more catalyst is helpful. When acidic impurities are present, as in the case of natural oils, waxes and the esters produced therefrom, sufficient alkali metal derivative must be present to neutralize this acidity and still leave excess alkali metal derivative as active catalyst. It is of course a necessity that the amine must contain replaceable hydrogen attached to the nitrogen atom, in order to be capable of amide formation.

Example I

Ethyl benzoate and monoethanolamine are mixed and the homogeneous mixture shows no sign of reaction at room temperature: when a few drops of a solution of sodium in monoethanolamine are added, heat is immediately liberated spontaneously, an exothermic reaction giving hydroxyethylbenzamide.

Example II 296 gms. of methyl oleate and 400 ccs. of anhydrous methanol containing 25.5 gms. of ammonia in solution are warmed together in a pressure bottle, the mixture becoming homogeneous well below 100° C., and then being maintained at 100° C. for three hours. On cooling, the excess ammonia is determined by titration and it is found that less than a 10% reaction has occurred. This experiment is repeated with the modification that the methanol solution of ammonia also contains 3 gms. of sodium in solution. Over the same reaction period of three hours at 100° C. reaction occurs, in this case to the extent of some 70%. Since there is some evidence that the amidation reaction is to a small extent reversible, the presence of lesser amounts of methanol is desirable, except that this involves a considerable increase in the ammonia vapour pressure over the reacting mixture.

Example III 1 kgm. of rape oil of acid value 2.6 and 190 gms. of monoethanolamine containing 2.5 gms. of sodium in solution, forming sodium aminoethoxide, are reacted with stirring at 100° C. After a few minutes the mixture becomes homogeneous and a temperature rise of 20 to 30° C. then occurs in the course of 1 to 2 minutes, reaction being then almost complete to a solution of glycerine in the monoethanolamides of rape oil fatty acids.

Example IV 4.2 kgms. of sperm oil, a waxy mixture containing spermaceti and an oil which is the fatty acid esters of higher alcohols, and 610 gms. of monoethanolamine containing 20 gms. of sodium in solution are reacted with stirring at 100° C. After a few minutes complete miscibility occurs with a considerable rise in temperature, giving rise to a mixture of fatty alcohols with fatty hydroxyethylamides.

Example V 3.1 kgms. of methyl ricinoleate, 1.5 kgms. of cyclohexylamine and 150 ccs. of methanol containing 15 gms. of sodium in solution, which form a homogeneous mixture, are reacted by heating together under a slowly increasing vacuum and using a reflux condenser, which returns cyclohexylamine but allows methanol to pass over to a brine cooled take-off condenser. Reaction occurs quite rapidly at 110° C., the speed of reaction being approximately 50% per hour. When no more methanol is evolved, the excess cyclohexylamine is distilled off under full vacuum and at a somewhat higher temperature, and any excess base is washed out of the product by N-hydrochloric acid, giving a product containing a high proportion of ricinoleic cyclohexylamide.

Example VI 84 gms. of hydrogenated castor oil (acid value=0.5, iodine value=8) and 16 gms. of monoethanolamine containing 0.2 gm. of sodium in solution are stirred at 100° C. for a few minutes until the usual exothermic reaction sets in, reaction being then almost complete to give a mixture of hydrogenated monoricinolein and hydrogenated ricinoleic hydroxyethylamide which on cooling sets to a hard waxy solid (cf. United Kingdom specification No. 558,893).

As further instances of the wide application of the process of the present invention to the manufacture of fatty amides, examples of other esters which may be used are esters of other monobasic acids such as ethyl acetate and the butyl esters of linseed oil fatty acids, or other esters of drying oils, the esters of substituted acids such as lactic, citric and tartaric acids, of phenolic acids such as salicylic and p-hydroxybenzoic acids. Phthalic and maleic esters and tetrahydrophthalic and other esters derived from the Diels-Alder maleic anhydride adducts are also suitable for the process. Spermaceti wax is also suitable. Self condensation can also be induced in amino-acid esters such as glycine methyl ester, though here self amidation is slower than amidation with a reactive amine such as monoethanolamine. Polyamides can also be formed from polyvalent reagents such as hexamethylenediamine and dimethyl adipate.

Among other amines which are suitable for the process are ethylenediamine, diethylenetriamine, and other polyamines, diethanolamine, hydroxyethylethylenediamine, and the amino alcohols derived from nitro-paraffins such as 2-amino-2-methyl-1-propanol, 2-amino-2-methyl-1.3 - propanediol, tris(hydroxymethyl) - aminomethane, and aromatic amino compounds such as anilines and naphthylamines. Tertiary amino groups do not, of course, react, but tertiary amino-amides may be made by the process of the present invention, using such mono tertiary polyamines as diethylaminoethylamine.

The acids which give suitable esters may be esterified with any alcohol free from acidic groups and other groups which will inactivate the alkali catalyst; suitable alcohols are thus the alkanols and polyhydric alcohols, cyclic alcohols such as benzyl alcohols and sterols, and heterocyclic alcohols such as tetrahydrofurfuryl alcohol, and in many of these cases the active catalyst is not strictly an "alkoxide," so that for the purposes of this specification catalysts are better described by the more general term of "alcoholoxides." The term "glyceride fat" as used herein includes glyceride oils.

Solvents are not generally necessary in the process of this invention, but may be added when desired. Suitable solvents are compounds which are substantially unreactive towards the catalyst and reagents and thus alcohols or ethers or tertiary amines may be used. Excess of the reagent amine or ammonia is in some cases also a very convenient diluent, thus esters may be amidated in solution in liquid ammonia in presence of an alkali metal alcoholoxide catalyst, or else an alkali metal in a form which will generate this catalyst, e. g. sodamide or a solution of sodium metal in liquid ammonia.

I claim:

1. A method of making amides which comprises mixing an ester of an acid taken from the class consisting of aromatic and aliphatic carboxy acids, the esterifying radical being taken from the class consisting of alcohols free from acidic groups, with a nitrogen containing compound taken from the class consisting of ammonia and amines having a replaceable hydrogen atom attached to nitrogen, adding a catalyst taken from the class consisting of alkali metal, its alcoholoxide, its amide in the substantial absence of water, heating said mixture to about 100° C., whereby a reaction occurs with the formation of amides of said acids.

2. A method of making amides which comprises mixing an ester of an acid taken from the class consisting of aromatic and aliphatic carboxy acids, the esterifying radical being taken from the class consisting of alcohols free from acidic groups, with a nitrogen containing compound taken from the class consisting of ammonia and amines having a replaceable hydrogen atom attached to nitrogen, adding a catalyst taken from the class consisting of alkali metal, its alcoholoxide, its amide in the substantial absence of water, heating said mixture to about 100° C., maintaining super-atmospheric pressure, whereby a reaction occurs with the formation of amides of said acids.

EDWIN MARSHALL MEADE.

REFERENCES CITED

The following references are of record in the file of this patent:

UNITED STATES PATENTS

| Number | Name | Date |
|---|---|---|
| 2,173,448 | Katzman | Sept. 19, 1939 |

FOREIGN PATENTS

| Number | Country | Date |
|---|---|---|
| 496,611 | Great Britain | Dec. 2, 1938 |
| 445,148 | Great Britain | Apr. 3, 1936 |